US005355756A

United States Patent [19]

Geiger

[11] Patent Number: 5,355,756

[45] Date of Patent: Oct. 18, 1994

[54] SOUND-ENHANCED STRINGED MUSICAL INSTRUMENTS

[76] Inventor: John F. Geiger, 190 Berwick Dr., Atlanta, Ga. 30328-1205

[21] Appl. No.: 17,596

[22] Filed: Feb. 16, 1993

[51] Int. Cl.[5] .......................... G01D 1/10; G01D 1/08; G01D 3/02

[52] U.S. Cl. .......................................... 84/270; 84/267; 84/294

[58] Field of Search ................. 84/269, 270, 271, 291, 84/294, 267

[56] References Cited

U.S. PATENT DOCUMENTS 360,005 3/1887 Fairbanks .
524,728 8/1894 Needham .............................. 84/270
550,951 12/1895 Dobson ................................ 84/270
1,334,631 3/1920 Piazza .
1,338,076 4/1920 Grover .
1,348,652 8/1920 Lange .
1,625,811 4/1927 Lange .
1,762,617 6/1930 Dopyera .
1,896,484 2/1933 Dopyera .
3,203,296 8/1965 Simon .
4,068,553 1/1978 Dopyera .
4,206,678 6/1980 Guerrero .
4,632,003 12/1986 Kopp .

*Primary Examiner*—Michael L. Gellner
*Assistant Examiner*—Cassandra C. Spyron
*Attorney, Agent, or Firm*—Kennedy & Kennedy

[57] ABSTRACT

A banjo has a resonator (24) mounted about the pot (11) and acoustical links (25) that acoustically couple the resonator with the banjo head (14). When the instrument is played acoustical waves pass from the head through the acoustical links to the resonator which amplifies the sound produced by the banjo. An adoption of this invention is also disclosed for a guitar.

8 Claims, 3 Drawing Sheets

SOUND-ENHANCED STRINGED MUSICAL INSTRUMENTS

TECHNICAL FIELD

This invention relates to stringed musical instruments of the types having resonating chambers such as banjos and guitars, and particularly to those designed for enhanced sound duration and volume.

BACKGROUND OF THE INVENTION

Stringed musical instruments generate sound by vibrations that occur when the strings are strummed. These vibrations are amplified by the resonating chamber. In banjos sounds produced are generally low in volume and short in duration. To many banjo players these sound characteristics are not desired although the general sound of the banjo is. Attempts to make louder and to clarify banjo sound have previously been made as seen in U.S. Pat. No. 1,348,652 an No. 1,625,811. The '652 patent to W. L. Lang discloses a banjo having a spacer securely mounted to the upper edge of its rim. The unmounted side is at a right angle with the horizontal edge abutting a head ring and the vertical edge abutting a circular hoop surrounding the rim. Upon vibration the banjo head creates sound that exits the head in a conventional manner and also through additional outlets formed by a spacer between the head ring and the rim and between the hoop and the rim, thereby preventing muffling. Lang '811 discloses a banjo having a sound regulator plate mounted to its lower rim extending across the bottom side of resonating chamber which creates a loud, clear tone. These modifications have altered the sound quality of the banjo, but have not produced a long-lasting, loud, clear sound.

Accordingly, it is seen that a demand remains for a stringed instrument that has improved sound sustenance in addition to greater loudness and clarity. It is to the provision of such that the present invention is primarily directed.

SUMMARY OF THE INVENTION

Briefly described, a stringed musical instrument has a resonator coupled by acoustical links to the vibrating membrane of a resonating chamber which enhances sound sustenance and loudness while maintaining clarity. Upon strumming the strings of the musical instrument a transfer of acoustical waves or vibrations occurs through the acoustical links between the resonator and the membrane.

In one embodiment of the invention, a banjo has a head ring type resonator having a reentrant portion mounted rigidly to the rim of the banjo pot and a vibratory portion spaced from the rim. A plurality of angularly spaced acoustical links is mounted upon the rim with one end of each link in abutment with a head ring and another end in abutment with the vibratory portion of the resonator ring. When the banjo strings are strummed, vibrations pass from the head ring through the acoustical links to the vibratory portion of the resonator ring. The resonator ring acts much like a bell in amplifying the sound emanating from the strings and pot.

In another embodiment of the invention, a guitar has a resonator plate mounted inside the guitar head. Acoustical links are mounted in abutment with the guitar head and the resonator plate. When the guitar strings are strummed, the acoustical links transfer vibrations back and forth from the head to the resonator plate which amplifies the sound. The addition of holes in the front side of the head enhances air flow within the guitar which prolongs sounds amplified by the resonator.

DETAILED DESCRIPTION

Figure 1:
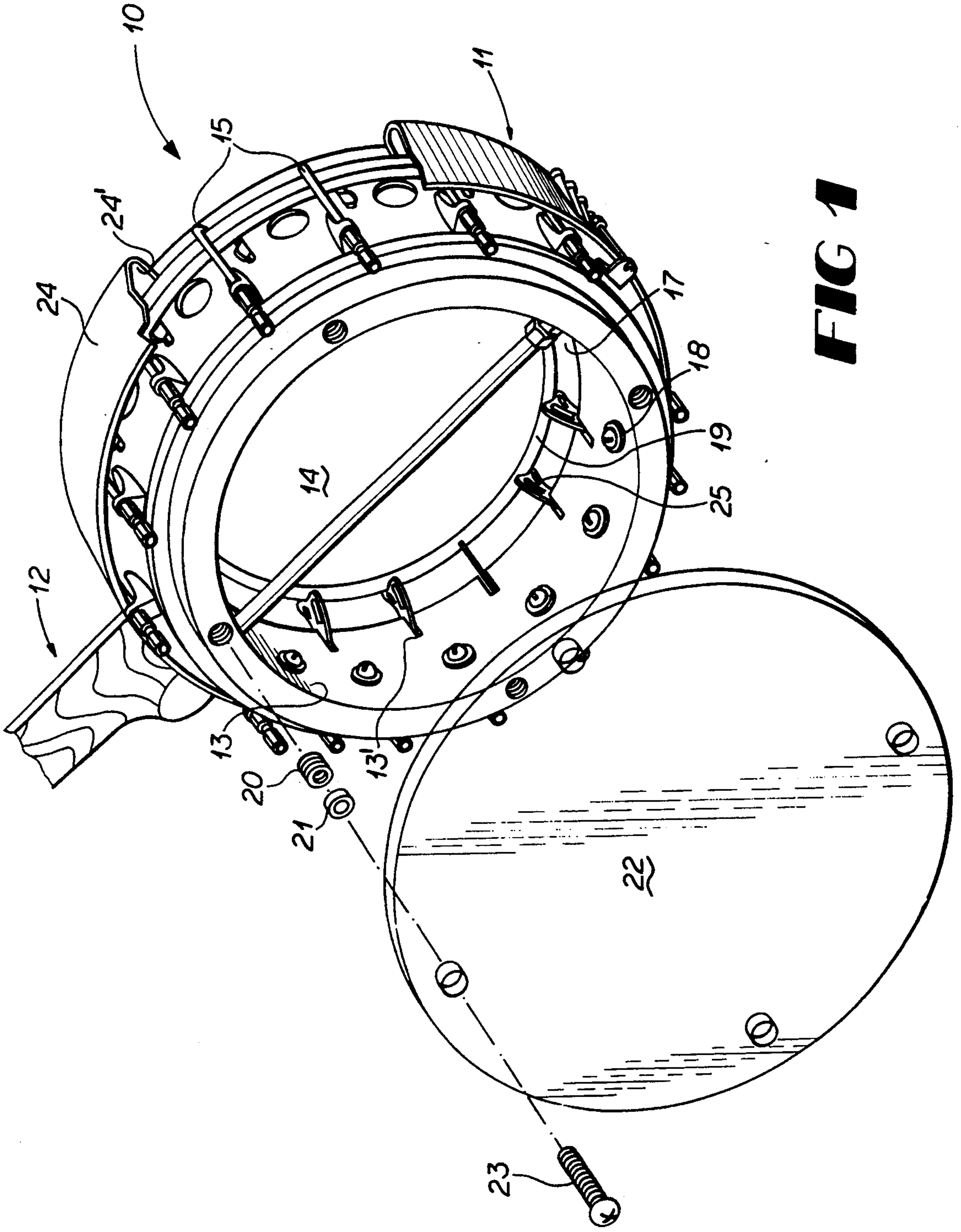
FIG. 1 is a perspective view of the underside of a banjo embodying principles of the present invention in a preferred form.

Referring now in more detail to the drawings, in which like numerals indicate like parts throughout the several views, a banjo 10 is shown in FIG. 1 having a pot 11 from which an elongated neck 12 extends. The pot 11 has a hollow, cylindrical wooden rim 13 with a set of slots 13' over one open end of which is mounted a banjo head 14. The head 14 is made of a thin, flexible sheet of plastic that is stretched tautly over the rim and secured in place by an annular array of clamp assemblies 15. In doing this a head hoop 16, that is attached to the periphery of the head 14, is mounted about a brass mid-rim 17 that is herein considered as being a portion of the pot rim. The brass mid-rim 17 is itself mounted to the outside of the wooden rim 13 and secured in place by screws 18. The banjo 10 here is of the type that has a head ring 19 mounted over the wooden rim 13 over which the head 14 is tautly held.

The wooden rim 13 has an annular array of brass inserts 20 along one side positioned over maple spacers 21. A plexiglass reflector 22 is mounted to this side of the rim 13 by means of machine screws 23 that extend through holes in the reflector 22, holes in spacers 21, and are threaded into the brass inserts 20 lodged in the rim. Thus far described the banjo is of conventional construction which, if desired, may be played with an unshown resonator of conventional cup-shaped configuration mounted about the pot.

Figure 3:
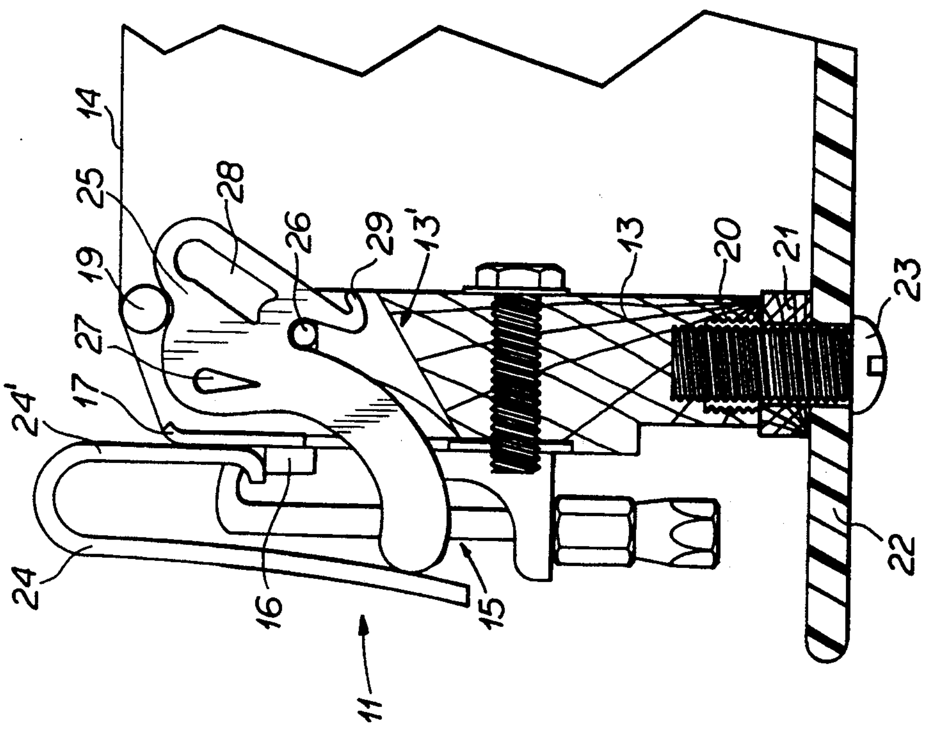
FIG. 3 is a cross-sectional view, on a larger scale, of a portion of the banjo shown in FIG. 1.

With continued reference to FIGS. 1 and 3, the banjo 10 is further seen to have an outer, metallic, flared resonator ring 24, which is also referred to as a bell-rim. The resonator ring 24 has a reentrant portion 24' that is mounted flushly about an end portion of the mid-rim 17 that is overlaid by a peripheral portion of the head 14 and with its end in abutment with the hoop 16. The resonator ring 24 is mounted securely in this position by the clamp assemblies 15. As seen best in FIG. 3, most of its reentrant portion 24' of the bell-rim is spaced from its outer portion sufficiently to accommodate portions of the clamp assemblies 15 therebetween.

An annular array of transverse bridges 25, herein also termed elephant links, is mounted adjacent an end of the rim 13 in the slots 13'. Each elephant link 25 is pivotally mounted on a pivot ring 26 that resides atop and flush with rim 13 and which is fastened in place by unshown recessed eye screws. The trunk-shaped portion of each elephant link 25 extends through a hole in the mid-rim 17 with the end of the trunk in abutment with the bell-rim 24. The head ring 19 is supported atop the elephant links 25 in a shallow recess atop their heads instead of on the rim 13 itself as it is conventionally mounted.

Note that the elephant links 25 have open spaces 27 and 28 that channel vibrations from the head ring 19 through the center portions of the links 25 through the trunk portions with some vibrations also channeled to a vibration trap 29.

In use, the banjo 10 is played in the conventional manner. As its unshown strings are plucked or strummed, acoustical waves emanating from the strings cause the head 14 to vibrate and the pot to resonate to generate the sounds common to banjos. With banjo 10, however, vibrations of the head and head ring 19 are transmitted via the vibrating elephant links 25 to the bell-rim 24 whose vibrations, much like those of a bell or horn, amplify those emanating from the pot 11. As the bell-rim 24 reverberates sound waves return from it through the elephant links 25 to the head ring 19 and back and forth for some time. This serves to prolong and sustain sounds generated by the banjo in addition to the amplification just described, both of which most banjo enthusiasts desire.

The enhanced quality of the sounds and music that this new type of banjo is capable of generating truly has to be heard to be appreciated. In addition to the just described enhancements of sound amplification and sustentation the banjo has the capacity of generating unusually loud sound peaks and outstanding sound quality at all volume levels. The former is believed due to the low friction suspension of the elephant links 25 upon the pivot ring 26 and the high energy transfer to the air. The latter is the result of planned vibration flow producing sound with minimal distortion and sound that is clear and rich with overtones.

Figure 2:
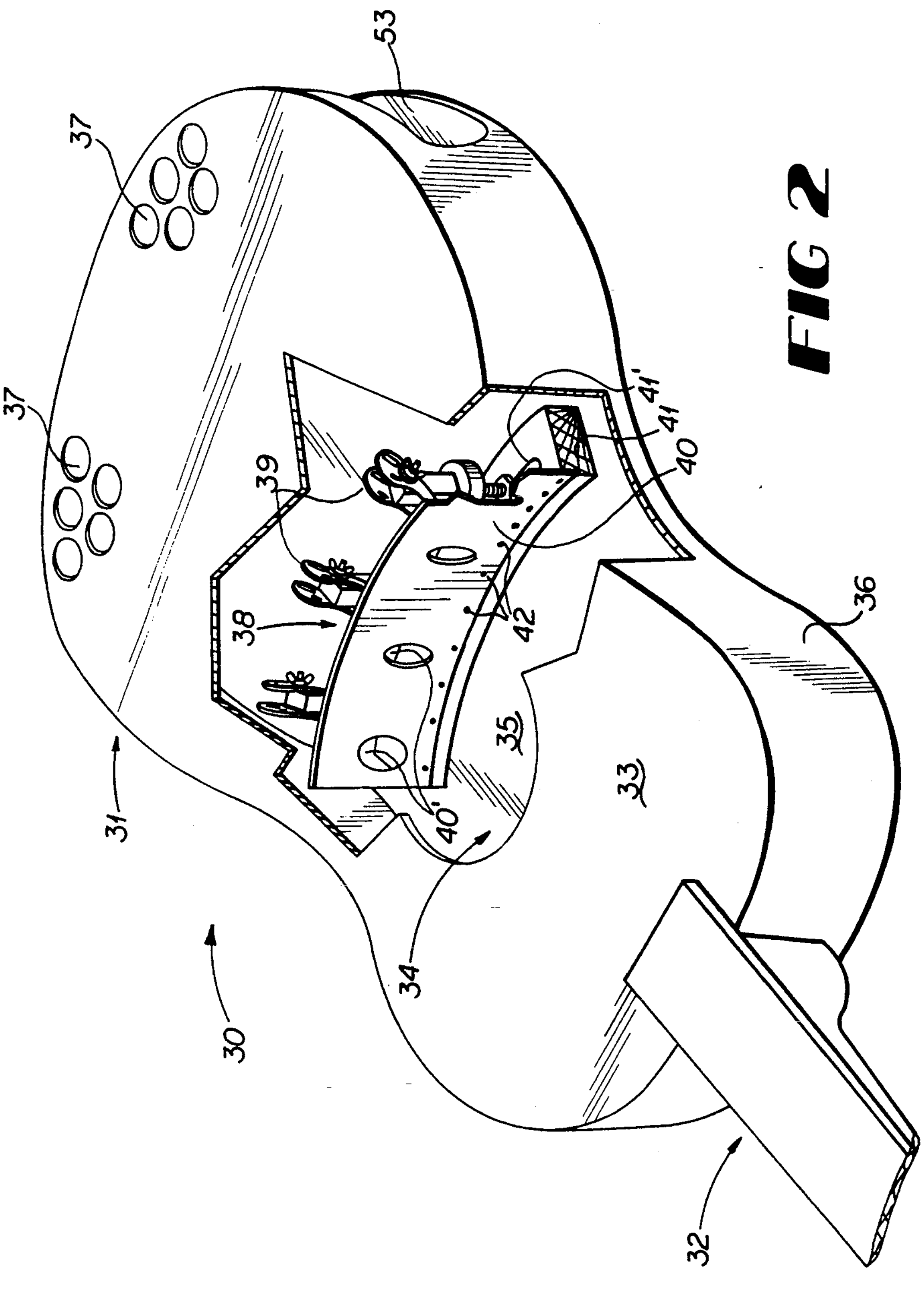
FIG. 2 is a perspective view of another embodiment of the invention in a guitar.
Figure 4:
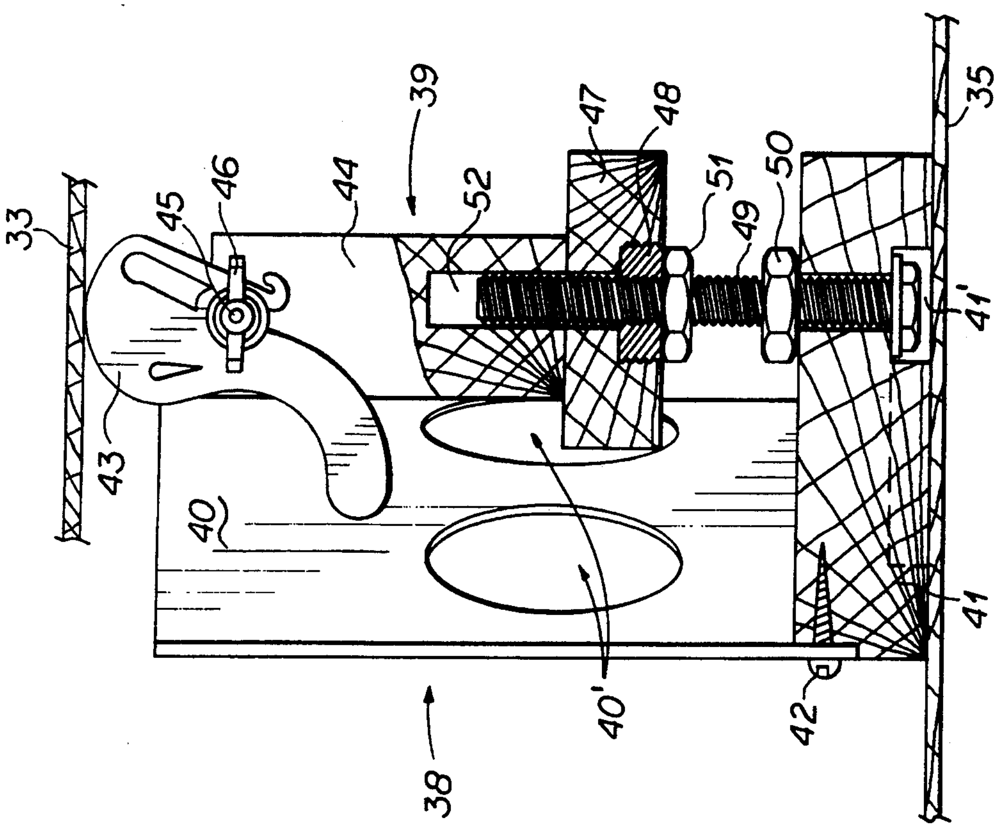
FIG. 4 is a cross-sectional view, on a larger scale, of a portion of the guitar in FIG. 2.

While the invention has thus far been described in detail embodied in a banjo, the invention is not limited to only that type of musical instrument. Its principles may be applied to other stringed instruments that have resonating cavities. A preferred other application is shown in FIGS. 2 and 4 in a guitar 30 having a wood head 31 from which a neck 32 extends. The head 31 has a front side 33 with a circular opening 34 referred to as a sound hole, a back side 35, and a serpentine wall 36 connecting the two sides. Although for clarity of illustration such have not been shown, the guitar has strings mounted along the length of the neck 32 which extend over and past the sound hole 34. Thus far described, the guitar is of conventional construction.

With continued reference to FIGS. 2 and 4, the guitar head 31 is seen to have a set of five air holes 37 each in two corner areas of the front side 33. A resonator assembly 38 is mounted inside the head 31 between the sound hole 34 and the air holes 37. The resonator assembly 38 has three bridge towers 39 and a curved, brass resonator plate 40 having four circular holes 40'. Depending on the preference of the guitarist more or less towers may be employed. Indeed, only one may be used. Various materials can be used to make the resonator plate dependant on the character of the sound desired. The bottom edge of the resonator plate 40 is mounted perpendicularly to a maple base 41 by screws 42 with the bottom of the base 41 positioned flushly upon the back side 35 of the head 31. The top edge of the resonator plate 40 is spaced from the front side 33 of the head 31.

As best shown in FIG. 4, each bridge tower 39 has a pair of metallic elephant links 43 pivotably mounted on opposite sides of the top portion of a tower block 44 by means of a bolt 45 which extends through a hole in the tower block 44 and a wingnut 46 so that the link straddles the block. The elephant links 43 rest upon a bearing (unshown) between washers (unshown) that are mounted on the bolt 45. The end of the trunk-shaped portion of each elephant link 43 abuts the resonator plate 40 while the arcuate head of each elephant links 43 abuts the inside of the front side 33 of the head 31. Note that the shape of the elephant links 43 is slightly different than those of the banjo 10 which have a shallow recess in their heads.

Each tower block 44 is mounted to a cylindrical elevator wheel 47 which has a centrally, nonrotatably inlaid nut 48. The bridge tower 39 may be mounted on the base 41 any place along a curved slot 41' by means of a bolt 49 which extends through a hole in the base 41, through two lock nuts 50 and 51, through the nut 48, and into a channel 52 in the tower block 44. By rotating the elevator wheel 47, the bridge tower 39 may be raised until the head of the link 43 forcefully abuts the front side 33 of the head 31 and the base 41 forcefully abuts the back side 35 of the head 31. By now tightening lock nuts 50 and 51, the bridge tower 39 is mounted snugly in place. The resonator assembly 38 may be placed into the guitar 30 through an oval hole 53 in the wall. 36, positioned and repositioned according to the preference of the guitarist.

In use, the guitar 30 is played in the conventional manner. As its unshown strings are plucked or strummed, the head 31 is caused to vibrate, and guitar sound is generated. With guitar 30, however, acoustical vibrations of the head 31 are transmitted from the head 31 via the vibrating metallic elephant links 43 to the metallic resonator plate 40. By utilizing the elephant links 43 in vibration transfer, the vertical deflections of the head 31 are converted to horizontal vibrations in the resonator plate 40. With the provision of air holes 37 vibrations of the resonator plate generate additional air flow from that in a standard guitar thereby increasing sound volume. The head 31 is believed to act much like an air pump. The resonator assembly 38 provides enriched resonance with overtones and harmonics. Loud yet rich sounds can be produced suggesting that the resonator assembly 38 successfully achieves an impedance match between spring and damping effects. This is achieved during tuning by the guitarist prior to performance by rotation of the elevator wheels 47 which places the guitar head 33 under differing degrees of tension while plucking the unshown strings. The elevator wheels are turned until a loud, rich sound occurs, indicating the attainment of resonance due to an impedance match between spring and damping effects.

It is thus seen that amplified and enriched vibrations are created by linking the heads of stringed instruments with resonators. Though two preferred embodiments have been illustrated and discussed in detail, many modifications, additions and deletions may be made thereto without departure from the spirit and scope of the invention as set forth in the following claims.

I claim:

1. A banjo comprising a pot having a generally cylindrical rim, a flexible head mounted tautly to one open end of said rim and a reflector mounted to the other open end of said rim, a resonator ring having a reentrant portion mounted rigidly to said rim and a vibratory portion spaced from said rim, a head ring mounted in contact with said head and a plurality of acoustical links mounted in contact with said head ring and with said resonator ring vibratory portion.

2. The banjo of claim 1 wherein said acoustical links are pivotably mounted to said pot rim.

3. The banjo of claim 2 wherein said head ring is mounted upon said pivotably mounted acoustical links.

4. The banjo of claim 1 wherein said pot rim has a plurality of slots and where said acoustical links extend through said pot rim slots.

5. The banjo of claim 1 wherein said acoustical links are metallic.

6. A banjo comprising a pot having a generally cylindrical rim, a flexible head mounted tautly to one open end of said rim and a reflector mounted to the other open end of said rim, and a resonator ring having a reentrant portion mounted rigidly to said rim and a vibratory portion spaced from said rim and wherein said resonator ring flares outwardly away from said rim towards said reflector.

7. A guitar comprising a hollow wood head having a front side with a sound opening, a back side, and a serpentine wall connecting said front side with said back side; a resonator plate mounted inside said hollow head; at least one acoustical link mounted within said head in contact with said head front side and said resonator plate; and mounting means for mounting said resonator plate at a plurality of positions inside said hollow head, said mounting means including means for adjusting the spacing and compression between said link and said hollow head back side; wherein said resonator plate and said mounting means are of a selected size and wherein said head serpentine side walls has an access hole of sufficient size to receive therethrough said resonator plate and said mounting means.

8. The guitar of claim 7 having ancillary sound holes located in said front side of said head.

* * * * *